United States Patent [19]
Whittaker

[11] Patent Number: 5,768,299
[45] Date of Patent: Jun. 16, 1998

[54] DERIVED GENERATION SYSTEM FOR PARITY BITS WITH BI-DIRECTIONAL, CROSSED-FIELDS UTILIZING STORED FLIP-BIT FEATURE

[75] Inventor: Bruce Ernest Whittaker, Mission Viejo, Calif.

[73] Assignee: Unisys Corporation, Blue Bell, Pa.

[21] Appl. No.: 592,088

[22] Filed: Jan. 26, 1996

[51] Int. Cl.$^6$ .................................................. G06F 11/00
[52] U.S. Cl. ...................... 371/49.1; 371/49.2; 371/50.1
[58] Field of Search .................................. 371/48, 40.11, 371/49.1, 49.2, 49.3, 50.1, 51.1, 44, 45, 38.1, 39.1, 40.17, 40.12

[56] References Cited

U.S. PATENT DOCUMENTS

| | | |
|---|---|---|
| 4,761,783 | 8/1988 | Christensen et al. .............. 371/40.11 |
| 4,852,100 | 7/1989 | Christensen et al. .............. 371/40.11 |
| 5,555,250 | 9/1996 | Walker et al. .................... 371/40.11 |

*Primary Examiner*—Reba I. Elmore
*Assistant Examiner*—Thomas E. Brown
*Attorney, Agent, or Firm*—Alfred W. Kozak; Mark T. Starr; Steven R. Petersen

[57] ABSTRACT

A network in which an incoming word of 4 bytes and 4 parity bits is split into an address pointer and Tag address data into a Tag RAM storing two bytes which do not align with the incoming bytes and which leave a 2-bit (x,y,) crossed field. A programmable array logic Control PAL places correct parity values into a Parity RAM for the 2 stored bytes and later recreates the original word of 4 bytes and parity bits by using a flip-bit value (SPX) which simplifies the regeneration of correct parity values.

5 Claims, 5 Drawing Sheets

5,768,299

1

DERIVED GENERATION SYSTEM FOR PARITY BITS WITH BI-DIRECTIONAL, CROSSED-FIELDS UTILIZING STORED FLIP-BIT FEATURE

FIELD OF THE INVENTION

This invention involves computer systems having processor and cache modules which use parity bits and methods for deriving parity bits from existing parity values in a bi-directional processor bus-cache environment where parity fields are crossed.

BACKGROUND OF THE INVENTION

A computer system involving digital modules being interconnected by dual system busses is shown in FIG. 3. Here a central processing module 10 is connected to the dual system busses 22a, 22b, which also connect to a main system memory module 40 and the input/output module 50.

The central processing module (CPM) 10 is shown in greater detail in FIG. 2 of such a system. Here, certain basic internal modules of the CPM are shown. These include the processor 14, which is the processing center of the module. The Data Path Array 20 provides paths from the processor 14 along the processor bus 14b to the Data Path Array 20 which provide paths to the dual system busses 22a and 22b. Control of data transfer operations is accomplished by programmable array logic designated Control PAL 16 shown in the shaded block. Another important module which is shaded for emphasis, is the RAM structure 19 which connects to the processor bus 14b and operates under the control of the Control PAL 16. The shaded modules shown as Control PAL 16 and the RAM structure 19 are the chief or the key modules involved in the described system. The RAM structure 19 is often embodied as a cache unit for the processor 14.

The Control PAL 16 constitutes a programmable soft, flexible device providing the necessary control logic for the CPM module 10. The RAM structure 19 could be considered to be of various types of RAM storage that might be required as part of a processing module. For example, the RAM structure could be a "register file" structure providing fast, temporary holding registers for the processor 14. Or, as in the example, discussed herein, the RAM structure 19 might be a local cache memory on the processor bus 14b as seen in FIG. 2.

Whatever might be the specific utilization and purpose of the RAM structure such as 19 of FIG. 2, it is known that RAM devices are somewhat a "weak" link in the reliability of system design. Because of this, various data integrity methodologies are often used to help insure data integrity in the RAM structures and also to detect invalid or bad data in the RAMs when they are read out. The use of "parity" codes is such a methodology. Parity methods provide the storing of several "extra" bit values along with the data values in the RAM devices. These "parity" bits (along with the actual stored data values) can be used to verify the data integrity at the time the data is read out from the RAM device, that is to say, to insure that what was "written into" the RAM device is exactly what is "read out" from it.

There are two types of basic parity methods which are known in the technology and these are the "odd" parity arrangement and the "even" parity arrangement. Either such type might be used, however, in the system and method discussed herein, the odd parity method was chosen. Thus the number of "one" bits in the stored "data value" plus the parity bits involved, must then add up to a "odd" number. If

2 this is not the case, then a parity error is detected and the data read-out cannot be considered reliable.

When the parity method is used for verification, there must be some means of generating and then checking the odd parity and such means must be added to the RAM structure, itself. There are standard-off-the-shelf devices which are available for simple parity structures and which can be used to generate and check parity integrity. One such device is the Model 74F280, manufactured by Texas Instruments Company. However, the use of such standard devices requires that the busses involved and the RAM structure involved be very directly mappable to each other. Sometimes such direct mappability is not present as will be indicated in FIG. 4 hereinafter.

In the system presented herein, several items will make the use of standard parity devices ineffective, and basically unusable. In this case and in other perceivable applications, there is seen to be a bi-directional nature to the parity bits as well as "fields" on which parity bits are generated being "crossed", that is to say, the parity bits and fields are not directly lined up. Incoming parity bits and their associated fields do not line-up (map) to "stored" fields and their parity bits. Likewise vice versa, on stored parity bits and their associated fields, there are those which do not line up with their outgoing parity bits and associated fields. The system and method described herein derives the "stored" parity values from the incoming existing parity values. Then, at a later period, when parity must be returned to the original source, (say, from cache to processor) the parity is again re-derived from the stored values.

As will be later indicated, this method works when the fields do not necessarily line up. Further, the parity generation is implemented as a small portion of a programmable array logic "FLEX PAL" as opposed to inflexible fixed standard parity generation devices. The "FLEX PAL" parity devices are those which are manufactured by the Intel Corporation of Santa Clara, Calif., or the Altera Corporation of Santa Clara.

SUMMARY OF THE INVENTION

In FIG. 1, the 32 bit (plus 4 parity lines) processor bus 14b carries a word of 4 bytes (3,2,1,0) and the four parity bits RP3, RP2, R1, R0 (seen at Level 1 of FIG. 4) over to transceiver 29p.

The parity bits "RPx" (RP3, RP2, RP1, RP0) are sent to the Control PAL 16 on 4 bit bus 25p.

The transceiver 29p "splits" the 4 incoming bytes (3,2,1,0) into two channel busses. Bus 28a, is the LPA (FIG. 4) (Lower Partial Address) bus which carries 12 bits (bits 13-2) to carry the locational address for Tag RAM 19t and Parity RAM 19p.

Bus 28b is the UPA (Upper Partial Address) bus which carries the 16 bits (bits 29-14) as Tag address data for storage in the Tag RAM 19t as "stored" bytes designated Style1 and Style0. Thus, only bits 29-14 of the original incoming word are stored in Tag RAM 19 as Style1 and Style0.

However, the two "stored" bytes, Style 1 and Style 0 now require "special parity bits" to be stored in Parity RAM 19p. This is accomplished by the Control PAL 16 which receives the original 4 parity bits RPx (x=3,2,1,0) and converts them to four parity bits (designated SPS, SPX, SP3, SP2) seen at Level 2 and 3 of FIG. 4, which are placed in the Parity RAM 19p. This is shown in FIG. 4 between Level 2 and Level 3. Thus, the two "stored" bytes (Style1 and Style0) have 4 stored parity bits in Parity RAM 19p which are designated as SPS, SPX, SP3, SP2.

Now, at Level 4 of FIG. 1, when the processor 14 wants to "read-out" the specific address location (in Tag RAM 19*t*) which holds the "stored" bytes Style1, Style0, the system must now recreate the outgoing word of 4 bytes (Level 4, FIG. 4) to "duplicate" the original word of 4 bytes (at Level 1). This, of course, also requires that the stored parity bits SPS, SPX, SP3, SP2 be used to regenerate the outgoing parity bits designated RP3' and RP2' since the original incoming parity values for RP1 and RP0 will be the same as the outgoing parity values for RP1' and RP0'.

The problem with regenerating the outgoing parity values for RP3' and RP2' is that they involve bytes which had a crossed field of bits 15, 14 of the original incoming word. The regeneration process here could be very time-consuming and expensive in circuitry required except for the development of the SPX flip bit by the Control PAL 16.

The Control PAL 16 (FIG. 1) determines whether the values of the crossed field bits 15, 14 are the "same" or "different". Thus when SPX=0 meaning that bits 15, 14 are the "same" in value, then the outgoing parity value of RPx' (3,2,1,0) will remain the same. If SPX=1 meaning that bits 15 and 14 have different values, then the final outgoing parity value RPx' is inverted (changed from 1 to 0, or from 0 to 1) from the original incoming parity value RPx.

The regeneration of the outgoing parity values RP3', RP2', RP1', RP0' operate such that RP1' and RP0' act to duplicate the original RP1 and RP0 parity values.

The other outgoing parity values RP3' and RP2' are converted from the "stored" parity values SP3 and SP2 according to SPX bit as being "0" or "1". If SPX bit is "1" then the parity value of SP3 and SP2 are "inverted" in order to regenerate the outgoing parity bits RP3' and RP2'.

DESCRIPTION OF PREFERRED EMBODIMENT

Figure 1:
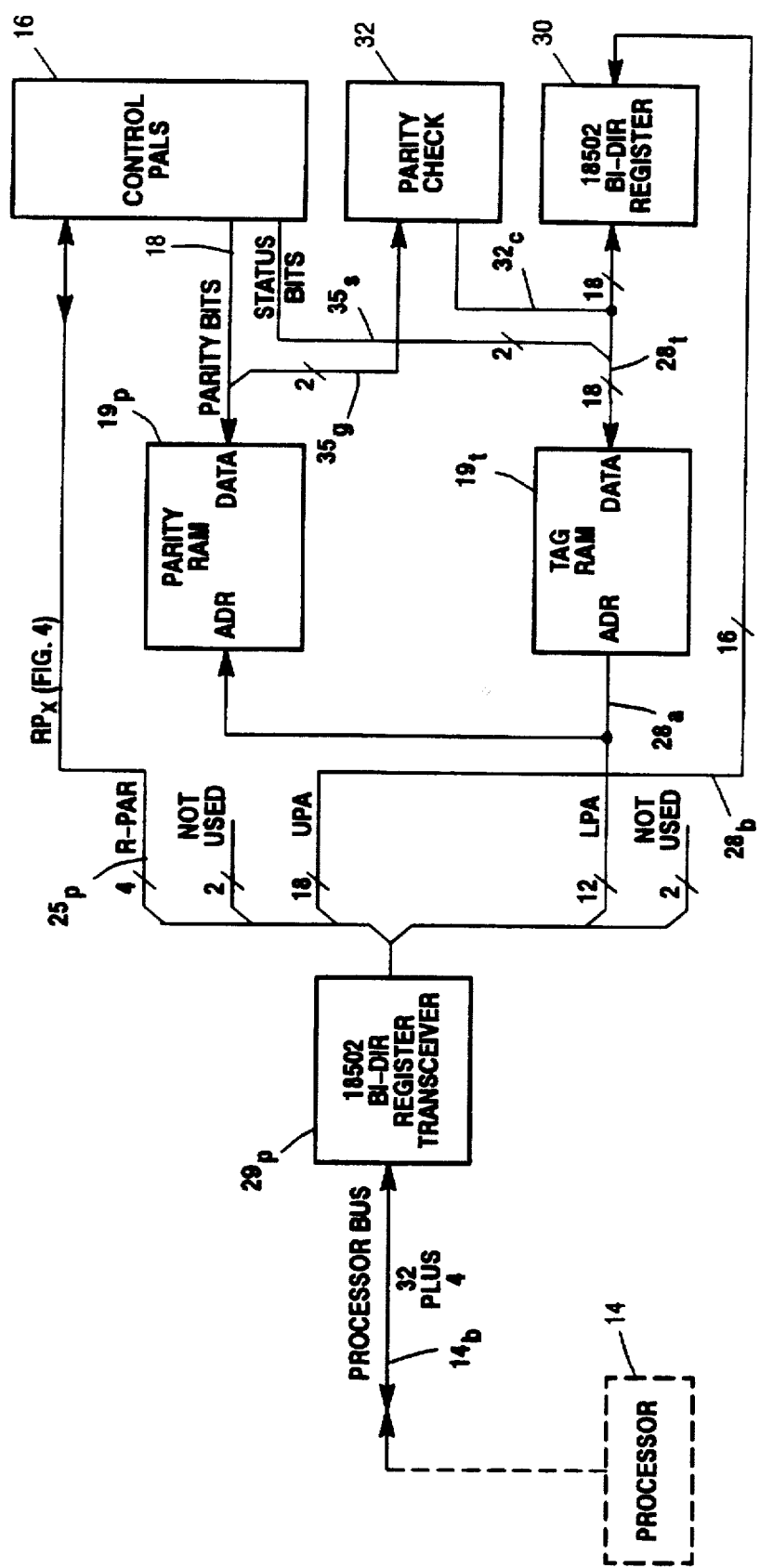
FIG. 1 is diagram showing a RAM structure having means for deriving the generation of parity bits when bi-directional crossed fields occur.
Figure 2:
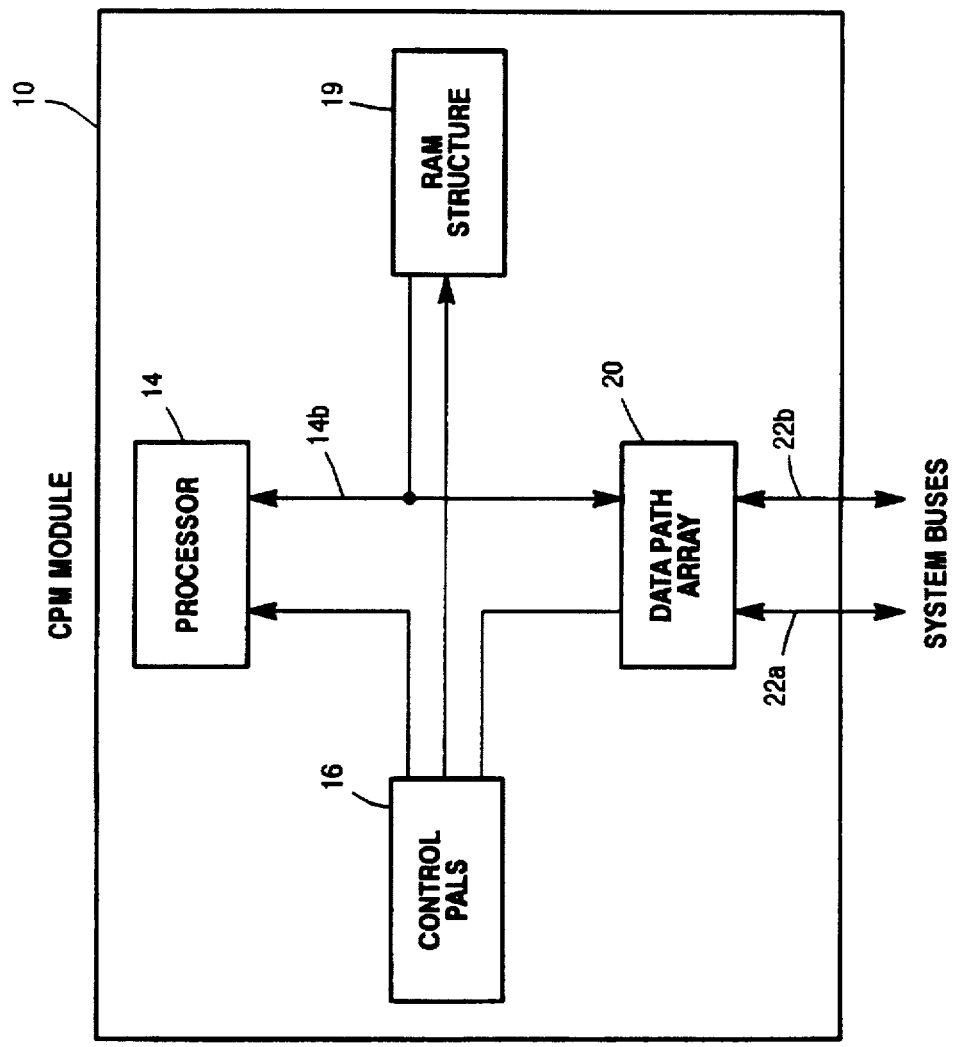
FIG. 2 is a drawing showing the basic architecture of the central processing module 10.

As seen in FIG. 1, there is indicated an expanded view of the RAM structure 19 of the central processing module 10 shown in FIG. 2. The incoming processor bus 14*b* connects the processor 14 to the RAM structure 19 which is seen to consist of a Tag RAM 19*t* for holding address data and a Parity RAM 19*p* for holding parity bits which reflect the parity of each word of address data in the Tag RAM 19*t*. A bi-directional register-transceiver chip, 29*p*, isolates the processor bus 14*b* from the internal RAM structure busses 28*a* and 28*b*. The register-transceiver chip that fulfills this function could be Model 18502 as manufactured by the Texas Instruments Company of Dallas, Tex. The incoming bus 14*b* from the processor has 32 bits (4 bytes) of address locations for cache 19 plus four parity bits RP3, RP2, RP1, RP0 of FIG. 4. The 32 bits of address can be considered to be provided by bytes where there is eight bits per byte while the four parity bits involve one bit of parity per byte.

The incoming parity values on the processor bus 14*b* of FIG. 1 are checked within the Data Path Array 20 (FIG. 2). This initial checking while useful is not part of the present system and methodology disclosed herein. The present system involves only the special creation (derivation) of parity values for storing data in RAM and the subsequent re-creation (re-derivation) of parity values to be returned, from RAM 19, to the processor 14 on the processor bus 14*b*. Thus the parity values which are incoming on the processor bus 14 to the RAM structures 19 are then re-submitted back on the processor bus for a proper evaluation.

The information from the processor 14 on the processor bus 14*b* over to the RAM structure 19 is internally divided into three separate parts. The lowest 2 bits (1, 0 in Level 1 of FIG. 4) are not used in the RAM structure 19 because the RAM structure deals in blocks of four words only. The next lower 12 bits are called the LPA bits (lower partial addresses for cache RAM locations) and are conveyed on the LPA bus 28*a* which pinpoints the address location in the RAM devices where data is to be stored. In FIG. 1, the incoming addresses to the Tag RAM 19*t* and to the Parity RAM 19*p* are provided on the bus 28*a*.

The next higher 16 bits involve the address data to be inserted into RAM 19*t*. These bits (FIG. 4, Level 1) are called the UPA (upper partial address) and are conveyed on bus 28*b* to the bi-directional register-transceiver 30. These upper 16 bits are the "data" (address) which is to be held and stored in the RAM structure 19*t* of FIG. 1. The upper 2 bits (30, 31 of FIG. 4) of the processor bus 14*b* data field are not used but must always be a "zero" value when the bus is active. Finally, the four parity bits from the processor bus 14*b* become the signals designated "IRPx" on line 25*p* between the Control PAL 16 and the processor bus 14*b*.

The RAM structure 19 of FIG. 1 is made up of two RAM devices where one device designated as the Tag RAM 19*t* stores the 16-bit UPA values plus two status bits on bus 35*s*. The second RAM device is designated as the Parity RAM 19*p* which stores four bits of parity, designated in FIG. 4 as SP2, SP3, SPX, SPS. The four bits of parity are necessary to insure the integrity of the 18 bits held in the Tag RAM device 19*t*. The generation and the "re-generation" of these four parity bits (for each of the four words in the Tag RAM 19*t*) is the major focus for the system and method of this integrity verification system.

The UPA bus 28*b* passes through another bi-directional register-transceiver 30 to carry the address data to be written via bus 28*t*, into the RAM device 19*t* of FIG. 1. This register-transceiver 30 is used to allow the values later read on-from the Tag RAM 19*t* to become a "source" back onto the UPA bus 28*b* (and thence to processor 14) at those times when the Tag RAM 19*t* is being read out.

The Control PAL 16 creates two "status" bits and these two status bits are placed via bus 35*s* for storage into the Tag RAM device 19*t*. This function is not critical or necessary to the present disclosure but sufficient for the system disclosed herein is the fact that the Control PAL 16 creates two status bits to be written into the Tag RAM 19*t*, and the Control PAL 16 monitors and checks the status bits when the Tag RAM 19*t* is subsequently read out by the processor 14 on processor bus 14*b*.

Additionally seen in FIG. 1, is the parity check unit 32. This is a standard off-the-shelf parity checking chip such as Model 74F280, manufactured by Texas Instruments Company. This standard device is sufficient for the checking of the parity on the 16 bits of tag RAM "data" which is conveyed on bus 28t. Two bits of the parity RAM bits appearing on bus 35g are used by the parity check chip 32 to verify parity on the Tag RAM' 16-bit address data field, (FIG. 4, Level 1) when the 16-bit data field is read out for transmission back to the processor on processor bus 14b.

Bi-Directional Movement Requirement: Referring to FIG. 1, it will seen that the processor bus 14b is bi-directional. Thus, the processor 14 can "source" information on the bus 14b toward the RAM structure 19 and toward the Data Path Array 20. Or, on the other hand, the processor 14 can "receive" information from the bus 14b from the RAM structure 19 and from the Data Path Array 20, in order to better illustrate the situations that arise, the following paragraphs will give exemplary cases where each of these actions might occur. Three situational examples are described and designated as A, B, and C, hereinbelow:

A. Processor to RAM Structure: If, for example, the processor 14 is executing a Read operation and if the RAM structure 19 of FIG. 2 is a cache memory structure, then information sent out of the processor 14 onto the processor bus 14b will constitute memory address type values. These "address data" type values will go to the RAM structure 19 for evaluation of a possible "cache hit" situation. In this "hit" case, the RAM structure 19 would be read-out using the LPA (lower processor address) portion of the processor address values which were transmitted on processor bus 14b through the LPA bus 28a. Then if, for example, in the foregoing READ operation, a "cache hit" condition was not found, that is to say, a "cache miss" occurred, then the address data information from Main Memory 40 on the processor bus 14b from the processor 14 read address will also be written into the Tag RAM 19t and to the Parity RAM 19p for later checking as future "cache hits." It is at this time and moment that the system and method of this disclosure can be used to create and "generate", by Control PAL 16, the four-bit "parity field" on bus 18 (FIG. 1) which is to be stored into the Parity RAM 19p.

Figure 3:
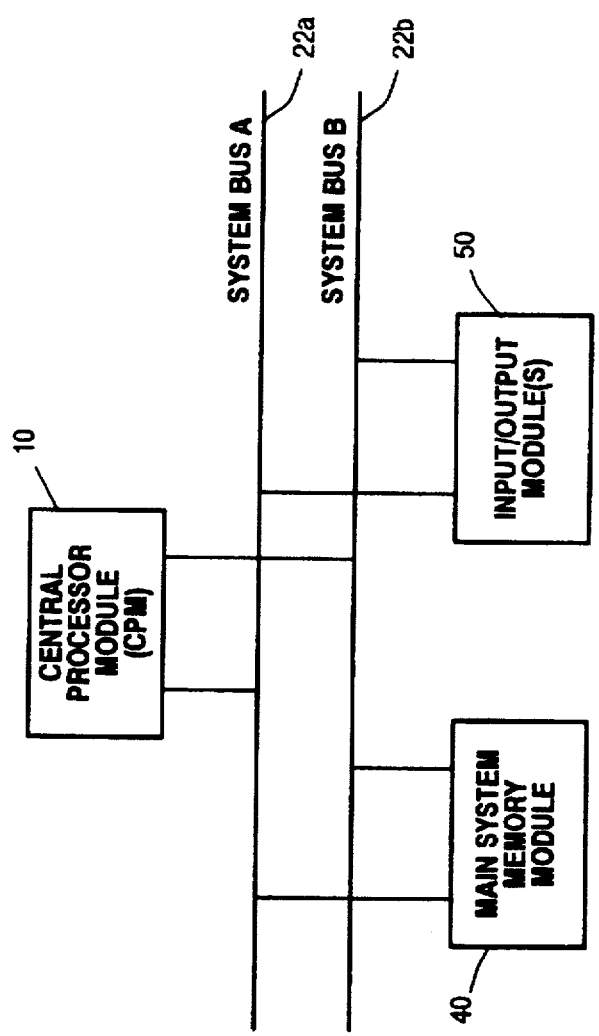
FIG. 3 is a drawing of generalized computer system having digital modules connected through dual system busses.

B. Processor to Data Path Array: All processor "output" type actions (like the situation discussed in paragraph A) will go from processor 14 to the Data Path Array 20 at least for the sake of checking parity on the bus 14b which, as seen in FIG. 2, connects the processor 14 to the Data Path Array 20. In the case of a MEMORY WRITE operation from the processor 14 to the main memory, then both the address and data information must be transmitted from the processor 14 to the Data Path Array 20 for later transmission to the main system memory 40 of FIG. 3. There are other processor actions, for example, SEND Message operations which also go from the processor 14 to the Data Path Array 20 for transmission to the I/O module 50 of FIG. 3.

C. RAM Structure Back to Processor: This situation utilizes another major feature of this system, mainly the re-creation (re-generation) of the parity values to be sent back to the processor 14 from the RAM structure 19. One example where this might occur is when there is "over-filling" (writing over) of previously written portions of the RAM structure which may occur. For example, on "cache miss" conditions during READ operations, the processor generated address data value might be written into the Tag RAM device 19t along with the appropriate and associated parity values being written into the Parity RAM 19p. However, if that particular RAM location, as addressed by the LPA bus 28a (FIG. 1) is already "full" as indicated by the two status bits (S, R of FIG. 5) on bus 35s, then the value contained within the Tag RAM 19t, at that location, may be needed to be sent back to the processor 14 for evaluation. In this situation, the value contained within the Tag RAM 19t at the addressed location is sent back and when it is sent back, the proper parity for this word must be "re-created" (re-generated) from the modified parity bits stored in the Parity RAM 19p at the addressed location. This particular situation indicates the use and application of the improvement disclosed in this system.

Crossed-Fields and Parity Bits: In the examples shown above, all actions to the RAM structure 19 are seen to begin by some action by the processor 14 onto the processor bus 14b. Thus, the initial address and the "address data" information along with the associated good parity values are initially "sourced" by the processor 14 on the processor bus 14b. From FIG. 1, it is seen that the data incoming to the RAM structure 19 via processor bus 14b is then split up into several partial busses which are internal to the RAM structure 19. The incoming processor bus 14b when converted to the various internal RAM busses 28a, (LPA), 28b (UPA) for the RAM structure, is now divided neatly over byte boundaries. Various fields from the incoming processor bus 14b are off-set to form various internal busses. Thus, the associated byte parity bits sourced by the processor 14 onto the processor bus 14b, "do not" align themselves up with the bytes of the internal busses 28a, 28b which is a requirement so as to have valid parity to be stored in the RAM device 19. Thus, as a result, new parity values must be generated for the internal data to be stored in the RAMs 19. The present method and system discloses means for deriving or creating this new "internal" parity from the incoming parity (from the processor) even with the crossed-fields. A special new parity value designated the "FLIP-BIT" is created and stored along with the other parity bits. This special bit holds information regarding the "crossed-fields" and is necessary to re-create (to re-generate or re-derive) the initial processor parity values when it is time to "send back" to the processor the stored information with the proper parity values.

Figure 4:
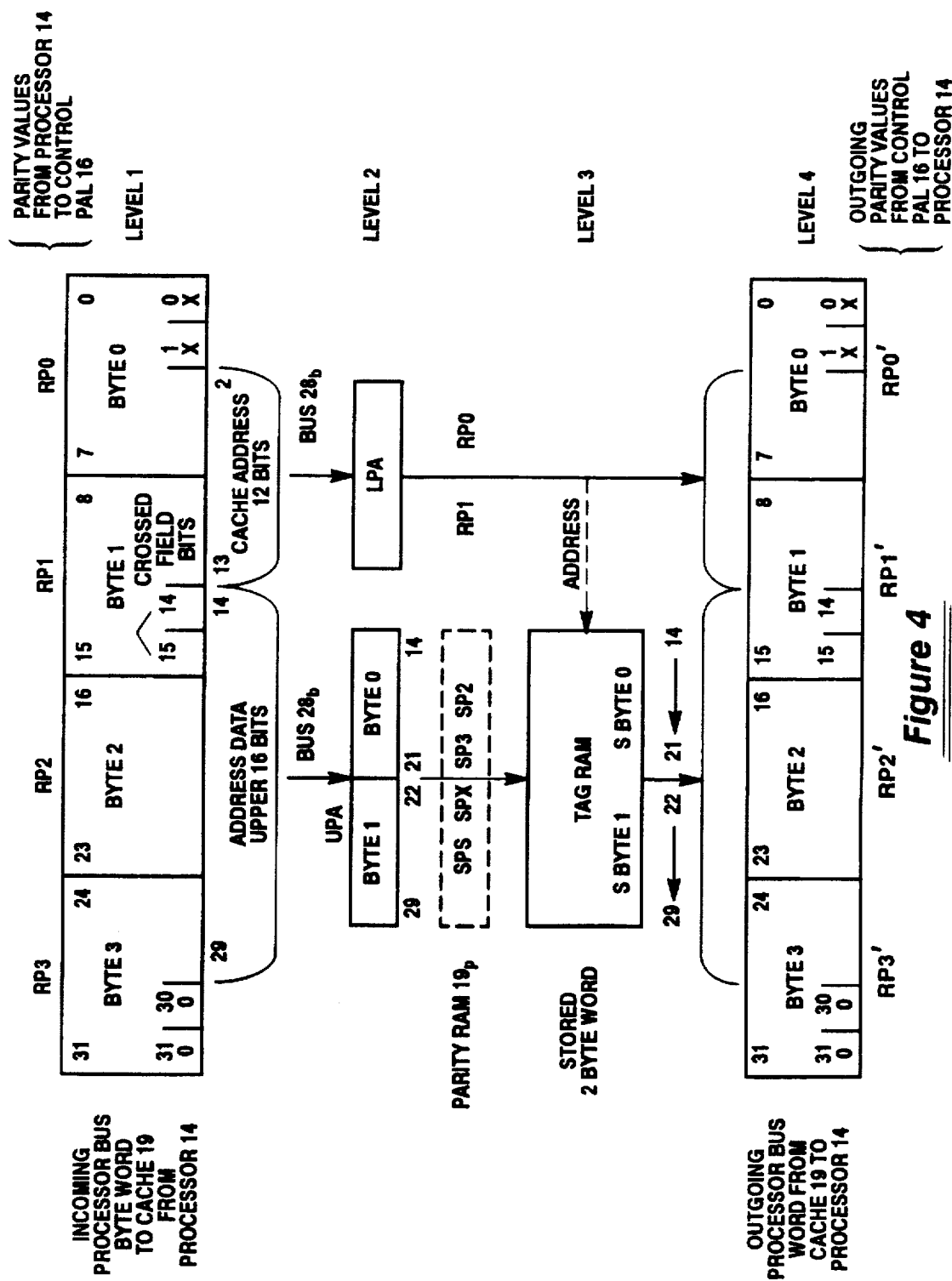
FIG. 4 is a drawing showing the flow of data information from the processor bus to the low level and upper level address busses which convey data to the cache Tag RAM device and the conveyance of parity values from a Control PAL to the processor.

Generation of Stored Parity Bits: FIG. 4 is a schematic drawing depicting the flow of data information from the processor bus 14b to the LPA bus 28a (FIG. 1) and the UPA busses 28b over to the stored Tag RAM items, and then shows the "reverse" flow from the Tag RAM 19t onto the UPA bus 28b (FIG. 1) and back on to the processor bus 14b through the bi-directional register-transceiver 29p. FIG. 4 also shows the parity bits which are associated with the various data bytes along the traveling path.

FIG. 4 has been indicated with four levels of information flow. At Level 1, RP0 is the parity bit for byte "0" when byte "0" is incoming from processor 14 so that byte "0" can select the same address location in the Tag RAM 19t as that in the Parity RAM 19p. RP1 is the parity bit for byte 1 of the bits for incoming "data". Bits 0-7 constitute Byte 0, while bits 8-15 constitute Byte 1, then bits 16-23 constitute Byte 2 and bits 24-31 constitute Byte 3. RP2 is parity on incoming Byte 2; and RP3 is parity for Byte 3. The Control PAL 16 of FIG. 1 functions to generate and place the parity bits into Parity RAM 19p at the corresponding address location of RAM 19t for each corresponding address data word in 19t.

Then, as between Level 1 and Level 2, it is seen that the LPA bus 28a carries 12 address bits (from Byte 0 and from Byte 1) over to the Tag RAM 19t at Level 3. Thus, the bits 2-13 (12 bits) constitute the locational address positioning for the Tag RAM 19t.

Then, further between Level 1 and Level 2, it is seen that bits 14-29 (16 bits of Tag "address data") are carried by the UPA bus 28b over to the Tag RAM 19t to provide the stored address word data. Thus, the 12 bits on the LPA bus provide the address to the Tag RAM while the 16 bits on the UPA bus provide the address data word to be placed at that address in the Tag RAM 19t.

Then in the "reverse" direction, from RAM 19 to processor 14 (from Level 3 to Level 4), it is seen that the stored address word in the Tag RAM (bits 14-29) can be passed on back to the processor 14 via the processor bus 14b while at the same time the locational address value can be passed on the bus LPA, 28a, back to the processor 14 on the processor bus 14b. At Level 4, it is seen that the return bytes are Byte 0, Byte 1, Byte 2, and Byte 3 and each of these return bytes will have a parity value. Thus, the Byte 0 will have the return parity value RP0'. RP0' is derived directly from the incoming RP0 (Level 1). Likewise, Byte 1 will have the return parity value designated RP1'. RP1' is derived from the incoming RP1, but modified, based on the stored flip-bit SPx. The Byte 2, return parity bit shown in Level 4 is designated RP2'. RP2' is derived directly from the stored SP2 bit. And further, Byte 3 has a return parity bit designated RP3'. RP3' is derived from the stored SP3 bit, but modified, based upon the stored flip-bit SPx.

In FIG. 4, from the processor bus 14b, there are four parity bits designated at Level 1 as RP3, 2, 1, 0, which correspond to the four bytes of data sent on the bus 14b by the processor 14. Now, however, and internally to the RAM structure 19, it is necessary to break apart the data bytes as shown in FIG. 4. The lowest two bits (0,1) are "don't cares" because the RAM structure 19 deals in four-word blocks and level 1 of FIG. 4 shows just one word. Bits (0,1) address individual words within the four-word block. The next 12 bits (2-13) transfer on the LPA bus 28a which address locations in the RAM structure 19. The next 16 bits (14-29) become the two bytes of address data to be stored in the RAM device 19t at the addressed location. Unfortunately, these two bytes (part of byte 1, all of byte 2 and part of byte 3, Level 1, FIG. 4) do not "align" with the incoming bytes from the processor as the fields are "offset." Thus, parity must be generated and stored for these two new "offset bytes" (byte 1, byte 0 of Level 2). Lastly, the upper two bits (30-31) are not used and are always a zero value. These bits are not used because they are outside the system's address range.

Since the Parity RAM device 19p, comes with four bits width of storage (an extra bit is also available), there has been provided a special way of generating the "new parity" on the two bytes of stored data seen at Byte 0 and Byte 1 of Level 2 of FIG. 4. The four newly stored parity bits are called as follows: SP3, SP2, SPX, and SPS.

Figure 5:
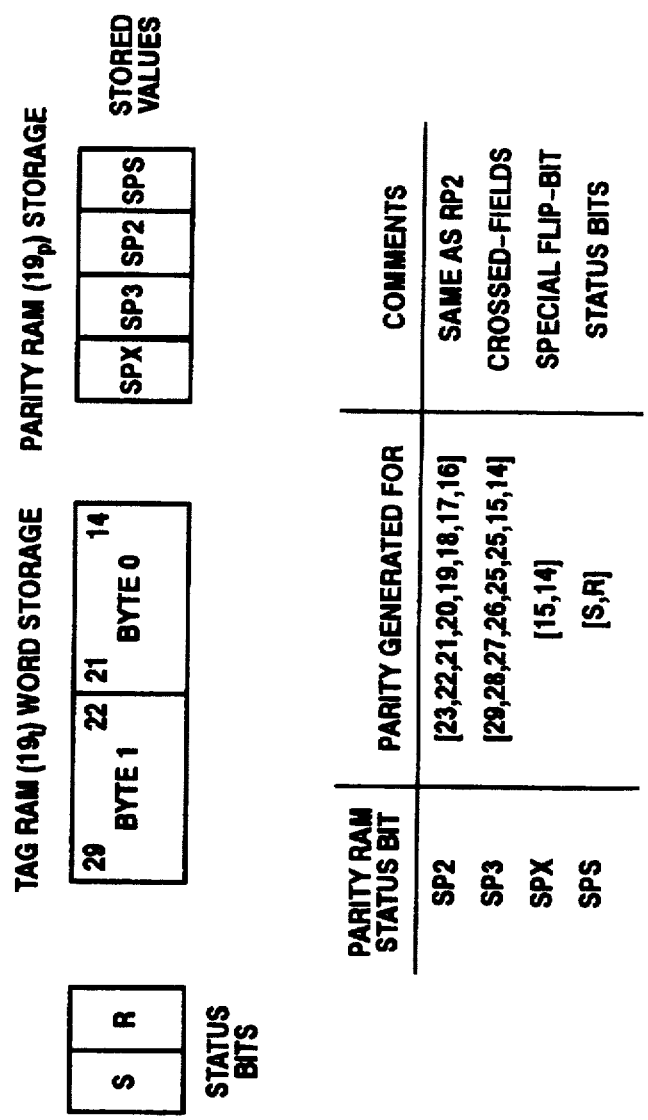
FIG. 5 is a drawing showing the structure of the cache Tag RAM and the Parity RAM in relationship to the status bits and the parity generated for each status bit.

By referring to FIG. 5, these parity bits (SP3, SP2, SPX, SPS) are shown along with the data bytes (bytes 1, 0 from Level 2) where 0=bits 14-21, and byte 1=bits 22-29 Thus, in FIG. 5, the data "stored" in the Tag RAM 19t indicates Byte 0 and Byte 1 in addition to the status bits S and R. Associated with these two bytes, there are stored values in the Parity RAM 19p and these are shown as SPX, SP3, SP2, and SPS. It may be noted that SPS applies only to the two status bits, S and R.

In the two bytes of stored data shown in Byte 0 and Byte 1 of FIG. 5, (shown in FIG. 4 as SBYTE 0 and SBYTE 1) there are seen to be 16 bits of information, since Byte 0 is 8 bits and Byte 1 is 8 bits. All 16 of these bits must be included in some manner within the parity bits generated. FIG. 5 shows how the generation of "new" parity from the existing parity by "cross-fields" occurs. From FIGS. 4 and 5, it will be seen that the parity bit SP2 is derived directly from the incoming parity bit RP2, shown at Level 1 of FIG. 4, also. This enables the elimination of any special generation logic. Thus, RP2 is the "parity" for on-bus (23 down to 16) of the incoming data field (Level 1 of FIG. 4). Then as is indicated by FIG. 5, this involves 6 bits of the stored Byte 0 (21-14) and two bits of the stored Byte 1 (23-22). Thus, as seen in FIG. 5, the stored parity bit SP2 involves the parity generated for bits 16 through 23.

This leaves the lowest two bits (15,14) of the Level 2 stored Byte 0 (SBYTE 0)(seen at Level 1 of FIG. 4) and the upper six bits of stored Byte 1 to require that they have their parity created for them. By using the cross-field method, this parity is created quite simply. Thus the "new" stored parity value SP3, is the incoming parity bit RP3 with an easy modification. In order to modify RP3 correctly, a special new "FLIP-BIT" value SPX must first be created and stored along with the other parity bits. It may be noted that the Parity RAM Device 19p does actually have this extra bit space. The FLIP-BIT is the stored parity bit designated as SPX. It is built from the two lower bits of stored Byte 0 (SBYTE 0)(processor bus bits 15,14). By looking at these two bits on the incoming data, it can easily be decided whether the RP3 bit can become SP3 directly or if it must be first "inverted" in value. Since the two crossed-field bits (15,14) are to be concatenated with the upper byte bits, they will affect the new parity value. If the bits (15,14) are both identical, that is to say, both are zeros or both are ones, then they have no affect on "odd parity" generation. Since parity generation is just the counting of "one bit" values to form an odd number combination, then if both the bits (15,14) are identical, they do not affect the odd number. If an addition operation is made of the value of zero (15,14=0,0) or the value of two (15,14=1,1) to any odd number, it will be seen to be remain as an odd number. The same holds true if the initial parity is not an odd number, that is to say, an even number. Thus, if the two bits are identical, the new special bit, FLIP-BIT "SPX" is set to "zero" when the two bits (15,14) can be ignored for parity purposes.

However, if the two bits (15,14) are not identical, that is to say, they are different in value, then they will cause the parity value to be reversed. Thus, if the bits (15,14=1,0) or (15,14=0,1), they will add a value of "one" to any incoming parity value. If the incoming parity value is an odd number, then it becomes an even number and vice versa. Thus, if the two bits are not "alike," the new special bit FLIP-BIT SPX is set to "1" so that the old parity value RP3 has been inverted to create a new parity value SP3.

It will noticed that the creation of the FLIP-BIT SPX occurs by looking only at the two bits (15,14). Thus, the logic to look at "two bits" is very much smaller than that required to generate parity on a full eight bit byte using conventional parity generation methods.

In order to provide for the generation of the FLIP-BIT "SPX", it is only required for a simple few gates to be used within the Control PAL 16. The system for this operation is shown in the equation of Table I.

TABLE I

| FLIP-BIT (SPX) | UPA15/ * UPA14 <br> + UPA15 * /UPA14 |
| --- | --- |

Note: * = AND; + = OR; / = NOT

For sake of completeness, the final parity "stored", designated SPS (shown in FIGS. 4 and 5) is generated onto the two stored "status" bits designated S and R in FIG. 5. Thus, the generation of the newly stored parity bits (even with the significantly crossed-fields) is accommodated very simply with the use of the "FLIP-BIT." The stored values for the newly stored parity bits are shown in Table II.

TABLE II

| NEW STORED PARITY BIT | INCOMING FROM PROCESSOR 14 PARITY BIT |
|---|---|
| SP2 | RP2 (parity on bits 23,22,21,20,19,18,17,16) |
| SP3 | RP3 (parity on bits 29,28,27,26,25,24,15,14) |
| SPX | FLIP-BIT |
| SPS | parity on the S and R values |

It should be noted that the parity value for 16 bits of data are created without the need for any large parity generation arrays. The incoming parity plus the FLIP-BIT provide all the items necessary for proper checking of the stored data and also for the re-creation of future parity to be sent back on the processor bus 14*b* to the processor 14.

Stored Parity Values-Checking: Each time the data from the processor 14 is written into the RAM structure 19 (19*p* plus 19*t*) such as the examples described in earlier paragraphs A, B, and C, then a "new parity" must be created from the incoming processor parity as discussed hereinbefore. The data and the new parity are then stored together. At some future time, when the RAM 19*t* is read-out, the parity will be used to insure the integrity of the stored data therein.

FIG. 1 shows the parity checking paths designated on bus 35*g* and 32*c*. Whenever the RAM devices 19*p* and 19*t* are read, for any reason, the four bits of parity that have been generated at the time of writing into the RAM are then read out with the data. At this time, a parity comparison and checkout occurs. The parity check unit 32 can check for correct parity on 16 bits of data and two parity bits. Thus, bus 32*c* will carry the 16 bits of stored Tag address data for the parity check and for which the two lines, 35*g*, will carry the two parity bits involved (SP2, SP3). Table III, below, shows how the data bits and the parity bits are steered to the parity checking devices in the parity checker 32. It should be noted that the stored address data from the Tag RAM 19*t* is called or designated as TAG (29,28,27 ... 15,14).

TABLE III

| STORED PARITY BIT | STORED DATA BITS |
|---|---|
| SP2 | TAG(23,22,21,20,19,18,17,16) |
| SP3 | TAG(29,28,27,26,25,24,15,14) |
| SPS | S and R status bits |
| SPX | not used for parity checking |

If, at the time that the RAM devices 19*p* and 19*t* are being read-out, the combination of the stored parity bit SP2 plus the eight bits of the Tag RAM outputs (29-24, 15, 14) indicated, do not add up to an "odd" number of one bits then a parity error has occurred. If the combination of the stored parity bit SP3 plus the eight bits of the Tag data shown in Table III, do not add up to an odd number of one bits, then again a parity error has occurred. If the SPS and the status bits S and R do not add up to an odd number of one bits, then a parity error also has occurred. Any of the above failures indicate that the data held in the RAM device has been corrupted and should not be considered as valid information.

Table III, above, is shown to have two columns, the left-hand column is the stored parity bit which corresponds to the stored data bits in the right-hand column. Thus, the stored parity bit SP2 is indicative of the parity for the bits 23 through 16 and likewise, the stored parity bit SP3 is indicative of the parity for the data bits 29 through 24 plus 15 and 14. The stored parity bit SPS gives the parity for the S and R status bits.

Re-Generation of Processor Bus Parity Values: From Level 3 to Level 4 of FIG. 4): The re-creation of the processor bus parity values from those which have been stored within the RAM devices 19 is a major focus in the system and method of this configuration presented. The prior discussion under paragraph C (page 11) was an indication of when it might be needful to regenerate the processor bus parity values. Under the conditions that require the "return" to the processor 14 of information that has been stored within the RAM structure 19, it is of course necessary that proper parity be returned to the processor along with this associated data. However, as already been indicated, the parity that has been stored in the RAM devices 19 is "not structured" in accordance with the processor bus byte formats.

Referring to FIG. 4, there is seen at the top, the front end of the RAM parity generation that was earlier described in the paragraph entitled "Stored Parity Bit-Regeneration." On the other end, is the parity "regeneration" from the crossed-field parity values that have been held in the Parity RAM 19*p*. In FIG. 4, the symbol designation SP may be considered to refer to "stored parity" values while the symbol "RP'" may be considered to refer to the re-constituted parity value.

Now referring to FIG. 1, and the transceiver-register 29*p*, the lower portion of the data field for the processor 14, is saved when it is transferred from the processor. That is to say, in FIG. 4, the LPA portion seen at Level 2, plus the two lowest bits (processor bits 13 down to 0) are held in the transceiver-register 29*p* to be sent back on to the processor bus 14*p*, back to the processor 14 when needed. These bits have not previously been stored in the RAM structures 19. The parity bits for the lowest byte, these parity bits being designated RP0 in FIG. 4, can also be held just as delivered by the processor, and subsequently sent back to the processor as good parity on the lowest byte, Byte 0, shown at Level 1 in FIG. 4.

The special FLIP-BIT, designated SPX, in FIG. 4, that has been held in the Parity RAM 19*p*, will be used for two distinct actions during the re-generation phase. First, SPX is used to re-create the second parity value shown as RP1' in FIG. 4. The original RP1 value that has just come from the processor has been created (in the processor) on all eight bits of the second byte (bits 15 down to 8). However, as seen in FIG. 4, bits 15 and 14 (crossed-field bits) will be "modified" when they are read-out of the Tag RAM devices 19. Therefore, the parity for the second byte (Byte 1) that the processor has sent over, must be modified to reflect the new values of bits 15 and just read out from the RAM device 19. The FLIP-BIT (SPX) allows that re-creation (modification) of the RP1 bit to be done very simply.

If the FLIP-BIT (SPX) is a "zero" value (=0) from the Parity RAM 19*p*, then nothing is done to the parity value RP1 that the processor 14 had originally sent out. This parity value RP1 can then be returned with the data to the processor 14 as the correct parity for the entire second byte (Byte 1). However, if the FLIP-BIT is a "one" value, then the incoming parity value for RP1 bit must be "reversed" (inverted). Thus, the incoming parity for the second byte (Byte 1) to be returned to the processor 14 is simply re-created by inverting or not inverting its value based on the value of the FLIP-BIT (SPX) FIG. 4. This type of logic is a very simple thing to build in the Control PAL 16. Table IV seen below gives the logic for these parity bits to be used as is or inverted.

The second action of the FLIP-BIT (SPX) is to re-create the RP3 parity bit from the "stored" SP3 bit (Level 3, FIG.

4). Here again, if the FLIP-BIT is a "0" value as read from the Parity RAM 19p, the SP3 bit that is also read from the Parity RAM can then become the new RP3 bit directly. However, if the FLIP-BIT is a "1" value, then the stored SR3 bit must be reversed (inverted) to become the new RP3' bit. The logic necessary to re-create the parity on the whole byte is seen in Table IV.

The last parity bit that must be re-created is the RP2 bit on the next to the last byte of data (Byte 2). This recreated parity bit RP2' can be created directly from the stored SP2 bit due to the crossed-field parity generation that was done earlier.

TABLE IV

| RE-CREATED OUTGOING FROM CACHE PROCESSOR BUS PARITY BIT | STORED or INCOMING TO CACHE PROCESSOR PARITY BIT |
|---|---|
| RP0' (parity on Byte 0) | RP0 (parity received from the processor) |
| RP1' (parity on Byte 1) | RP1 * FLIP-BIT/ + RP1/ * FLIP-BIT |
| RP2' (parity on Byte 2) | SP2 (stored parity value) |
| RP3' (parity on Byte 3) | SP3 * FLIP-BIT/ + SP3/ * FLIP-BIT |

Notes: * = AND; + = OR; / = NOT; FLIP-BIT = SPX

All of the cross-field creation and subsequent re-creation of the parity values have been implemented in a small portion of an Intel flexible programmable array logic device. The special FLIP-BIT "SPX" has allowed the nature of the crossed-field bits to be remembered and has allowed the easy re-creation of the necessary bus parity values.

Described herein has been a system and method which provides the capability to generate parity from incoming parity values, even when there are offsets in the field domains (crossed-fields). The integrity of the stored data in cache can be checked with the newly re-generated parity values when data is removed from cache to be sent to the processor. Also, at a later time, the data stored within the RAM devices can be concatenated with other data and a new parity re-created in a simple, inexpensive fashion.

While a specific implementation of the above-described method and system for re-generating parity for crossed-fields has been indicated, it should also be understood that other configurations of the above system and method may be implemented and still fall within the scope of the following claims.

What is claimed is:

1. In a network where a central processor means transmits an original word of 4 original bytes (Bytes 3,2,1,0) to a transceiver means and 4 parity bits to a Control PAL means to store a word of two (2) address data bytes in a Tag RAM which two stored address data bytes do not align with said 4 original bytes leaving two bits x,y from Byte 1 crossed over into Byte 2, a system for generating correct parity bits for said two stored bytes in a Parity RAM which can later be regenerated into copies of the original incoming parity bits when said stored word of two address data in said Tag RAM is read-out by said central processor means, said system comprising:

(a) Control PAL means for generating the correct parity in said Parity RAM for said two (2) stored bytes, and including:
(a1) means to generate a flip-bit value SPX to indicate whether said bits x,y are the same digital value or are different digital values;

(a2) means to use said SPX value to recreate the original 4 parity bits, for said original word of 4 original bytes, from said SPX values, when said central processor means reads out said stored two bytes.

2. In a network using a transmitted original word of incoming 4 bytes and 4 parity bits from a central processor means to a cache structure having a Tag RAM holding two bytes of stored Tag address data which two stored bytes do not align with the incoming 4 bytes, leaving two bits x,y as crossed field bits, a system for generating correct parity to a Parity RAM for the two stored bytes which later can be efficiently regenerated for output back to said central processor means to duplicate the original word of 4 bytes and 4 parity bits, comprising:

(a) means to convert said 4 incoming parity bits into stored parity bits which provide correct parity values for said two stored bytes, including:
(a1) generating a flip-bit SPX value into said Parity RAM which indicates whether said crossed field bits x,y are of the same digital value (SPX=0) or are of different values (SPX=1);
(a2) generating a parity value, SPS for a 2 bit validity indicator for said incoming word;

(b) means, using said stored parity bits and said SPX and SPS values to regenerate a correct duplicate of the original 4 incoming parity bits for read-out to said central processor means.

3. In a system where a processor transmits an incoming word of 4 bytes and 4 parity bits to a cache structure wherein said 4 bytes are split into a first field for pointing to a location in a Tag RAM and Parity RAM, and a second field holding Tag address data of 2 bytes for placing said Tag address data into said first field address location, a system for placing correct parity values into said Parity RAM to coordinate with the two bytes of stored Tag address data in said Tag RAM and then to regenerate said placed correct parity values into final outgoing parity values which duplicate the original incoming 4 parity values, for transmission to a central processor, said system comprising:

(a) processor means for transmitting, to said cache structure, an incoming word of 4 bytes and 4 parity bits;

(b) means to split said incoming word of 4 bytes into location pointers for a Tag RAM and Parity RAM and into 2 bytes of Tag address data for storage into the address Tag RAM location including:
(b1) means to transmit said 4 incoming parity bits to a Control PAL means;

(c) said Control PAL means for converting said 4 incoming parity bits into new parity values designated SPS, SPX, SP3, SP2 where SP3 and SP2 represent parity bit values for the 2 stored bytes in said Tag RAM and where SPX is a flip bit which designates whether bits 15, 14 of the incoming word are the same value or are of different values, and where SPS is the parity value of 2 status bits for the said incoming word;

(d) means, when said central processor seeks to read out an address location in said Tag RAM, to regenerate the original word of 4 bytes and the original 4 parity bits for transmission to said central processor.

4. In a network for splitting an original incoming 32 bit word of 4 bytes and 4 parity bits into a locational address pointer of 12 bits, and Tag address data of 16 bits which Tag data is stored in a Tag RAM as two 8-bit bytes (S-byte 1 and S-byte-0), said two stored 8-bit bytes being out of alignment format from said incoming 4 bytes leaving 2 bits x,y as crossed field bits, a method of efficiently providing correct parity bits, for said two stored 8-bit bytes and for enabling regeneration of said original incoming words with their original 4 parity bits comprising the steps of:

(a) placing said original 4 parity bits in a Control PAL means;

(b) calculated the correct parity for said two stored 8-bit bytes;

(c) placing said correct parity into a parity RAM;

(d) sensing whether said x,y crossed field bits are the same in value (SPX=0) or different (SPX=1) to generate a SPX value to place in said Parity RAM;

(e) regenerating the original incoming 4 bit parity values for output to a central processor means with the original word of 4 bytes.

5. In a network where a central processor means transmits an original 32-bit word of 4 original bytes (Byte 3,2,1,0) to a Tag RAM and 4 original corresponding parity bits (RP3, RP2, RP1, RP0) to a Parity RAM and where said original 32-bit word is sorted into a 12-bit cache address and a 16-bit set of address data such that said 12-bit cache address and said 16-bit set of address data each span two or more of said 4 original bytes and said 16-bit set of address data crosses over to include 2 bits x,y of the original byte 1 of said original word transmitted, a system for deriving correct parity bits for each of said 4 originally transmitted bytes when said central processor reads out an original 32-bit word from said Tag RAM to said central processor means, comprising;

(a) transceiver means for splitting said original 32-bit word from said central processing means into an Upper Partial Address (UPA) and a Lower Partial Address (LPA) wherein:

(i) said LPA utilizes bits 13-2 of said original 32-bit word as an address to place said address data in said Tag RAM;

(b) a Tag RAM for storing said address data bits 29-14 at the address determined by said LPA wherein bite 15,14 are crossed-field bits used by the UPA which are borrowed from original byte 1;

(c) a Parity RAM means for storing a parity bit (RP3, RP2, RP1, RP0) for each transmitted original type of said 32-bit word; said parity RAM storing:

(i) a parity bit SP3 for bits 29-22 of said Upper Partial Address (UPA);

(ii) a parity bit SP2 for bits 21-14 of said UPA;

(iii) a parity bit SPX which indicates whether said crossed field bits 15,14 are the same or different;

(d) means, when said central processing means, requests address data (bits 29-14) from said Tag RAM, to regenerate the original parity values (RP3, RP2, RP1, RP0) for each byte (Byte 3,2,1,0) of said original 32-bit word, said means including:

(d1) Control PAL means for generating:

(i) the parity bit SP2 for bits 21-14; and (ii) the parity bit SP3 for bits 29-22 which constitute the stored address word of 2 bytes; and (iii) the parity bit SPX.

* * * * *